P. J. KOTTUM.
ANIMAL TRAP.
APPLICATION FILED MAR. 23, 1909.
958,505.
Patented May 17, 1910.
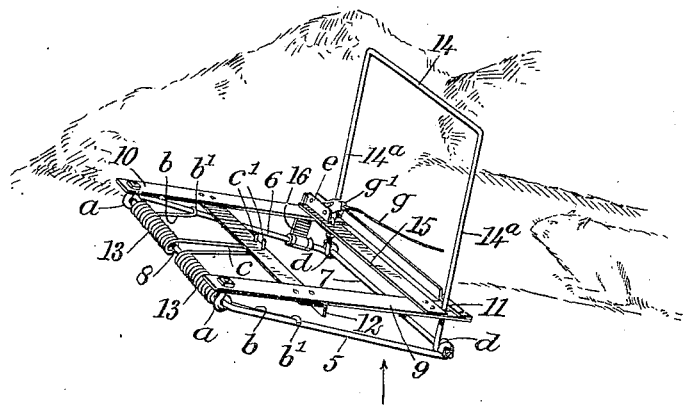
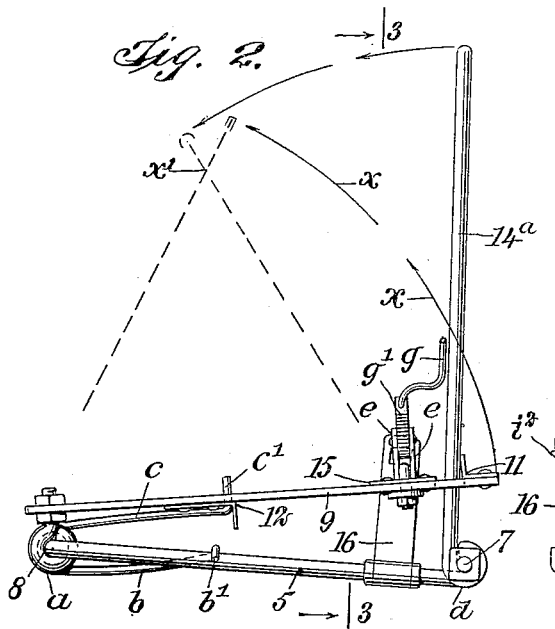
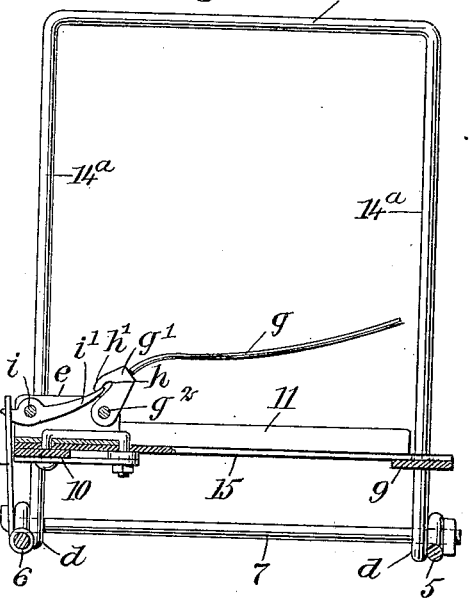
WITNESSES
INVENTOR
Peter J. Kottum
BY
ATTORNEYS

UNITED STATES PATENT OFFICE.

PETER J. KOTTUM, OF SACRED HEART, MINNESOTA.

ANIMAL-TRAP.

958,505.   Specification of Letters Patent.   Patented May 17, 1910.

Application filed March 23, 1909. Serial No. 485,154.

*To all whom it may concern:*

Be it known that I, PETER J. KOTTUM, a citizen of the United States, and a resident of Sacred Heart, in the county of Renville and State of Minnesota, have invented a new and Improved Animal-Trap, of which the following is a full, clear, and exact description.

This invention relates to animal traps of a class that choke the captured animal to death, and has for its object to provide novel details of construction for a trap of the character indicated, that are simple, strong, easy to produce, and which, when assembled, present a compact trap that is very effective and kills the animal without injuring its pelt.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a perspective view of the improved trap, having the working parts thereof adjusted for catching a rodent or other animal; Fig. 2 is an enlarged side view of the trap, seen in the direction of the arrow in Fig. 1; and Fig. 3 is a transverse sectional view taken substantially on the line 3—3 in Fig. 2.

A rectangular frame of heavy wire rod material constitutes the base for the trap, 5 and 6 representing parallel side members, and 7 and 8 front and rear members thereof respectively.

9 and 10 indicate two similar flat bars of metal that are at their rear ends hinged upon the rear transverse frame member 8 by means of eye-bolts $a$. The flat bars 9 and 10 are spaced apart parallel with each other by a front cross bar 11, and a similar cross bar 12, positioned midway between the cross bar 11 and the rear frame bar 8. The cross bars 11 and 12 are formed of angle-iron, and at their rear ends are secured upon the bars 9, 10 by rivets or the like, and it will be noted that a member of the angle-iron bar 11 projects upward, and a like member of the cross bar 12 extends downward.

The four flat bars, 9, 10, 11 and 12, by their hinged attachment at $a$, $a$ upon the rear frame member 8, provide a rockable clamping frame for the trap. On the rear transverse member 8 of the base frame, two coiled springs 13, formed of heavy resilient wire, are mounted, each having two locking arms $b$, $c$, respectively, extended from their ends. The arms $c$ that are adjacent to each other, being formed on the inner ends of the springs 13, are extended forwardly, and upon their forward ends, hooks $c'$ are formed, that engage the front edge of the frame bar 12, said arms passing across the lower side of said frame bar and through a central notch formed in the depending flange of the frame bar, whereby the hooks $c'$ are interlocked therewith. There are hooks $b'$ formed on the outer arms $b$ of the springs 13, that are hooked over the respective side members 5, 6 of the base frame, and by said engagement the springs are put under tensional strain, so that when free, the rockable clamping frame will be forcibly thrown upward and rearward, as is indicated by the curved arrows $x$ in Fig. 2.

A wire clamping bail 14, having rectangular form, is hinged on the base frame member 7 at the lower ends of the parallel side members, by forming eyes $d$ thereon, said side members 14$^a$ working loosely in perforations formed in the side bars 9, 10.

Immediately rearward of the perforations in the side frame bars 9, 10, a cross bar 15 is secured at its ends on said frame side bars, said cross bar near one end thereof having two spaced parallel flanges $e$, $e$ erected thereon; as shown in Figs. 1 and 3, said flanges are positioned at the left side of the trap.

Between the flanges $e$, $e$, a heel block $g'$ for a trigger arm $g$ is pivoted at $g^2$, said heel block having a notch $h$ formed therein, that extends over the pivot $g^2$ and provides a catch $h'$ on the heel block. The block $g'$ is positioned a short distance from the outer end of the flanges $e$, and near said ends a latch dog $i$ is pivoted, said dog having a finger $i'$, that extends toward and may be slightly engaged with the catch $h$, as shown in Fig. 3. The other end of the latch dog $i$, that terminates in a short toe $i^2$, projects outward, and may engage within a perforation in the upper end portion of an arm 16, that is hinged at its lower end on the side member 6 of the base frame.

To set the trap, the clamping bail 14 is disposed in a vertical position by an enforced depression of the rockable spring-pressed frame, which is held in that condition by the interlocked engagement of the latch dog finger $i'$ with the catch $h'$. The trigger arm $g$ now extends across the space between the side members $14^a$ of the clamping bail 14, and above the cross bar 15.

It may here be explained that while the improved trap is available for the killing of gophers or other rodents, it is especially well adapted for killing and capturing small wild game, such as skunks, which are valuable for their pelts.

Assuming that the trap has been set, it is placed at a run-way or burrow of such game as it is desired to capture, with the clamping bail foremost. The animal may be lured by a bait, or the trap may be concealed by covering it with leaves or the like, so that the animal, when passing through the bail 14, will be compelled to depress the trigger arm $g$, which will release the dog $i$, which will in turn release the rockable clamping frame that has been held depressed by said dog. The tension springs 13 will instantly throw up the rockable frame, which will simultaneously rock the clamping bail 14 rearwardly, as shown by dotted lines in Fig. 2, the point $x'$ indicating the position of the intersection of the rockable frame and the clamping bail when the trap is sprung. The skunk or other animal that has passed partly through the clamping bail 14 will be caught by the neck between said bail and the bar of the rockable frame and strangled instantly, thus preserving the fur of the animal from injury, as it is found that when such animals are suddenly choked to death, the shock prevents them from discharging the disagreeable stinking liquid that would injure the pelt.

Having thus described my invention, I claim as new and desire to secure by Letters Patent:

1. The combination with a base frame, and a spring pressed rockable frame hinged at one end upon the base frame, of a clamping bail hinged at the opposite end of said base frame and having straight side members, the said rockable frame slidably engaging the said side members of the clamping bail and adapted when in depressed position to hold the said clamping bail in a vertical position and at right angles to the base frame, and means for releasably holding the rockable frame depressed against the tensional force of the spring, the said means including a pivoted trigger arm carried by the rockable frame near one side thereof and extending across the space between the side members of the clamping bail.

2. The combination with a rectangular base frame, a rectangular rockable clamping frame formed of flat bars, and having its side members perforated, the rockable frame being hinged at one end on a corresponding end of the base frame, and two springs having arms respectively engaged at their free ends with the rockable frame and side members of the base frame, of a clamping bail hinged at its ends upon the opposite end of the base frame, said clamping bail having its side members passed through the perforations in the side members of the rockable frame and being disposed in a vertical position, when the rockable frame is in depressed position, and means for detachably holding the rockable frame depressed against the tensional force of the springs.

3. The combination with a rectangular base frame formed of wire, a rockable clamping frame formed of flat metal bars and having rectangular form, said frame being hinged at its rear end on a corresponding end of the base frame, and two springs formed of coiled resilient wire, having arms that have hooked engagement at their ends on the base frame and the clamping frame, of a clamping bail formed of wire rod in rectangular shape, the lower ends of the side members of said clamping bail having hinged engagement with the front transverse member of the base frame, and a device for holding the clamping frame depressed against tension of the springs, comprising a supplementary cross bar on the rockable frame provided near one end with spaced parallel flanges, a trigger arm having a heel block that is pivoted between the said flanges, a rockable latch dog, having a finger that engages at its end in a notch in the heel block, and a rock arm hinged at its lower end on a side member of the base frame, said rock arm having a perforation in its upper end portion wherein a toe on the other end of the latch dog is inserted.

4. An animal trap, comprising a rectangular base frame, a rectangular clamping bail having straight side members hinged to the front end of the base frame, a spring pressed clamping frame rectangular in shape and hinged at one end on the rear end of the base frame, the side members of the said spring pressed frame near the other end of said frame loosely engaging the side members of the clamping bail and adapted when the spring pressed frame is in depressed position to hold the clamping bail in a vertical position, means for detachably holding the spring pressed frame depressed against the tension of its spring, the said means including a trigger arm carried by the spring pressed frame, and extending when the trap is set in the path of an animal passing through the said clamping bail.

In testimony whereof I have signed my name to this specification in the presence of two subscribing witnesses.

PETER J. KOTTUM.

Witnesses:
BERT LISTERUD,
H. C. SKALBECK.